Sept. 3, 1929.　　　A. E. BILLGER　　　1,726,801
VALVE REAMER
Filed Aug. 23, 1926
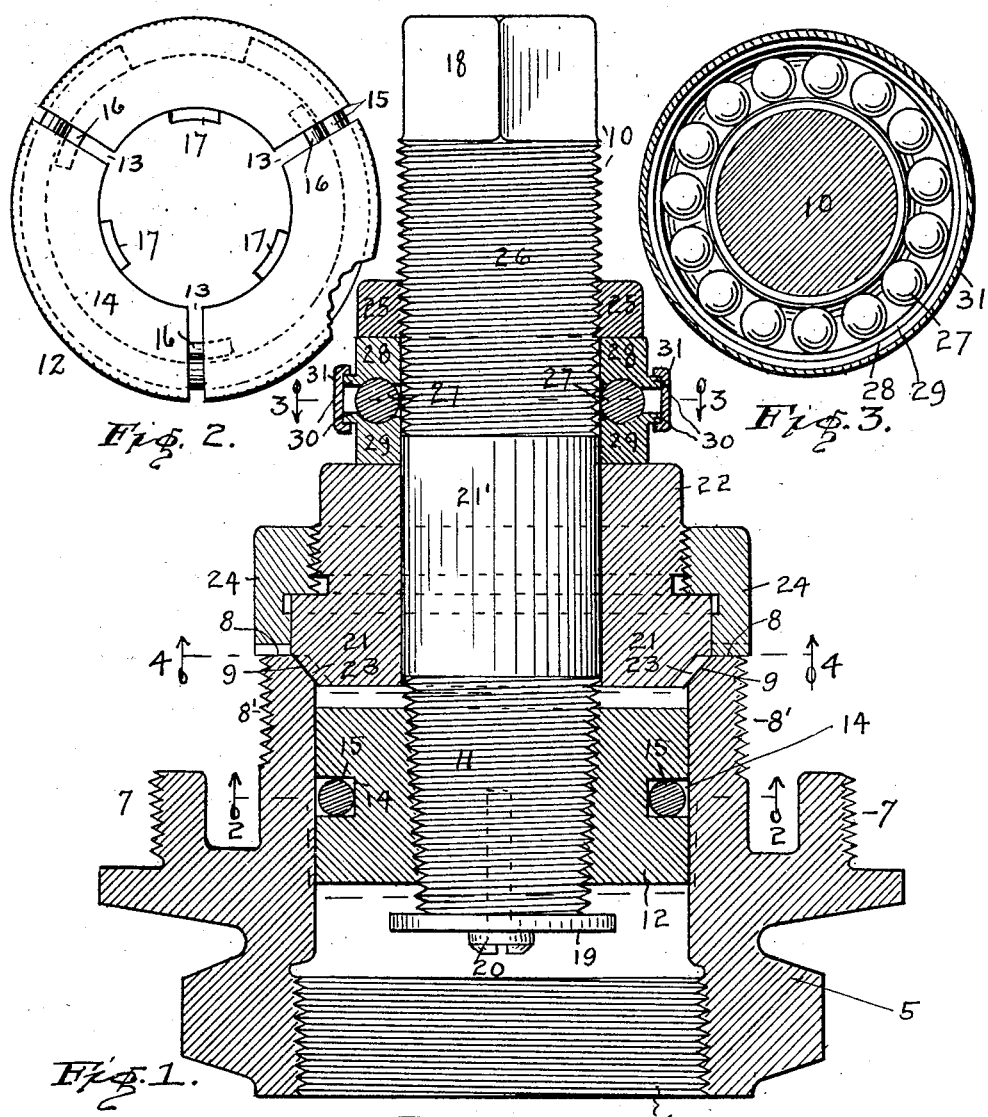
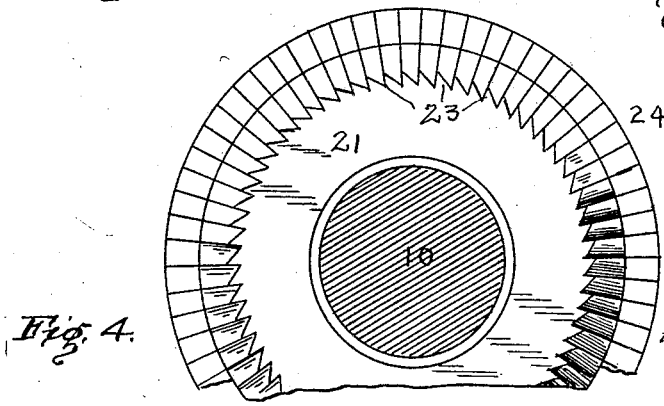
Inventor,
Alonzo E. Billger
By
Minturn & Minturn,
Attorneys.

Patented Sept. 3, 1929.

1,726,801

UNITED STATES PATENT OFFICE.

ALONZO E. BILLGER, OF INDIANAPOLIS, INDIANA.

VALVE REAMER.

Application filed August 23, 1926. Serial No. 130,892.

The object of this invention is to provide a reamer for shaping surfaces, such as the seats for pop-valves of steam boilers, gas engine valves, and the like, without the time and trouble of removing the member to be repaired, from the mechanism with which it is operatively assembled, as heretofore required.

I accomplish the above and other minor objects connected therewith, which will hereinafter appear, by the reaming tool illustrated in the accompanying drawing, in which—

Fig. 1, is a section through its longitudinal axis, of the seat for a pop-valve, with the valve and its retaining members eliminated, and my reaming tool in operative position on the valve seat; all of said reamer except the mandrel being in section longitudinally of the mandrel;

Fig. 2, is an under side view of the split expansion head looking in the direction of the arrows of line 2—2 of Fig. 1;

Fig. 3, is a cross-section on the line 3—3 of Fig. 1; and

Fig. 4, is an under side view of the cutters as seen from the line 4—4 of Fig. 1.

Like characters of reference indicate like parts in the several views of the drawings.

The pop-valve body 5 is of usual construction, and has an internal thread 6 by which it is screwed to its support which is not shown. It has externally threaded members 7 and 8, for the attachment of the usual valve housing and shell, not shown, but which are screwed off for the removal of the valve, which is not shown, and to afford access to the valve seats 8 and 9, which are the surfaces to be dressed by the aid of my invention, without the necessity of removing the valve seat from the mechanism with which it normally operates.

The parts of my reamer are assembled around a mandrel or arbor 10, the inner end 11, of which is tapered and screw threaded, and receives thereon a head 12, which is here shown as split by three radial kerfs or slots 13 which allow the head to expand as it is screwed upon the end 11. The head has an outside annular channel 14, into which a nearly circular metal spring 15 is sprung to hold the split members of the head together. A section of the circle of spring 15 is removed to form a sufficient opening shown by dotted lines in Fig. 2, for the spring to be spread in assembly on the head 12. The three members of the head 12 are held an equal distance apart in their contracted positions by dowel pins 16, seated in sockets of proper depth to accomplish that purpose. The bore of the head to receive the threaded end 11 of the arbor has a corresponding thread 17, which is preferably filed off or otherwise removed adjacent the ends of the sections formed by the kerfs. The face of the head may be knurled, as shown, or plain.

The outer end 18 of the arbor is squared to receive a wrench by means of which the arbor is rotated to screw its tapered end into and out of the head 12, in the operations of tightening or loosening the expanding head 12 in the bore of member 6; and to keep the arbor from being screwed out of the head too far, I attach a disk 19 to the inner end of the arbor by a screw 20, in the manner shown in Fig. 1.

By the foregoing means the arbor 10 will be centered and locked in the seat member 5.

Above the tapered end 11, is a cylindrical, unthreaded portion 21', of the arbor, on which a cutting head 21 of hardened, reamer-tool steel is mounted. The upper end 22, of this head is reduced in diameter and the outer part of it is made hexagonal to engage a turning wrench. The outer lower end is larger and its outer portion is beveled and formed with cutting teeth 23, of the required shape as to the bevel of the valve-seat to be cut. An inner cylindrical portion of the reduced end of the head is provided with left hand threads on which a ring 24, having cutting teeth to cut the square end of the valve seat, is screwed. The ring 24, is of the same hardened metal as head 21, and has left hand threads to cause it to tighten when the two heads are rotated with a wrench applied to the hexed end 22.

The cutters, as above described, are fed against the valve seat by rotating a nut 25, hexed to receive a wrench, on the threads 26 formed on arbor 10 near its outer end. Between the nut 25 and cutter head 21 is a thrust bearing, on balls 27, to allow the cutters to be rotated without danger of disturbing the feed. The balls are mounted in races appropriately formed in a pair of rings 28 and 29, here shown as having flanges 30, 30, to engage an inside channel in a locking band, 31.

In the operation of my device, after the member having the valve seats to be reamed are cleared of the valve and valve housing, the head is inserted and expanded, then the cutting members are positioned on the surfaces to be reamed by screwing the nut 25, in or out, as the conditions may require; then the cutters are rotated by the manipulation of a wrench applied at 22, and the feed of the cutters is regulated by a wrench applied to the nut 25.

Having thus fully described my invention, what I claim as new and wish to secure by Letters Patent of the United States, is—

In a tool for securing valve seats and the like, an arbor, an expanding head on the inner end holding the arbor centrally of the seat to be reamed, a cutter manually rotatable on the arbor upon the valve seat, a ring on the cutter having teeth to cut the square end of the valve seat, means to cause the last cutter to tighten on the first when the first is rotated in a direction to cut, and means for feeding the cutters against their work.

In testimony whereof I affix my signature.

ALONZO E. BILLGER.